United States Patent [19]

Hayashi et al.

[11] Patent Number: 4,669,967

[45] Date of Patent: Jun. 2, 1987

[54] APPARATUS FOR QUANTITATIVELY EXTRUDING FOOD MATERIAL

[75] Inventors: Torahiko Hayashi; Yasunori Tashiro, both of Utsunomiya, Japan

[73] Assignee: Rheon Automatic Machinery Co., Ltd., Tochigi, Japan

[21] Appl. No.: 834,579

[22] Filed: Feb. 28, 1986

[30] Foreign Application Priority Data

Mar. 2, 1985 [JP] Japan ................................. 60-41482

[51] Int. Cl.$^4$ ....................... B29C 47/54; A21C 11/18
[52] U.S. Cl. ............................. 425/376 R; 99/450.8; 222/309; 222/381
[58] Field of Search ................... 425/376 R; 222/309, 222/381, 376; 99/450.8 X, 450.7

[56] References Cited

U.S. PATENT DOCUMENTS

| | | | |
|---|---|---|---|
| 523,553 | 7/1894 | Stickney | 222/381 |
| 1,940,564 | 12/1933 | Schilling | 99/450.7 |
| 3,101,761 | 8/1963 | Buehler et al. | 99/450.7 |
| 4,084,494 | 4/1978 | Ezaki | 99/450.7 |

Primary Examiner—Willard E. Hoag
Attorney, Agent, or Firm—Finnegan, Henderson, Farabow, Garrett & Dunner

[57] ABSTRACT

An apparatus for quantitatively extruding food material is provided.

The apparatus comprises a hopper, a frame supporting the hopper and having a chamber therein with first and second ports, to which a nozzle and a piston and cylinder assembly are connected, and a cylindrical food forming device.

The food material which flows from the hopper into the chamber is confined by the cylindrical food forming device and forms a cylindrical body, which is then extruded by the piston from the nozzle, whereby even food material including large solids can be quantitatively extruded.

2 Claims, 10 Drawing Figures

FIG. I

APPARATUS FOR QUANTITATIVELY EXTRUDING FOOD MATERIAL

BACKGROUND OF THE INVENTION

1. Field of the Invention

The present invention relates to an apparatus and method for quantitatively extruding food material and the like by a piston, and more particularly to an apparatus and method for quantitatively extruding fluid food material such as cream or jam, solid food material such as vegetables, fruit, or pieces of cooked fish meat, and a cooked food comprising the solid food material and paste or the like from a nozzle to inject into bread or confectionery.

2. Description of Prior Art

There has been provided an apparatus for injecting food material and the like into an article, in which a hopper, a nozzle, and a cylinder containing a piston are disposed around a valve mechanism. When the valve is arranged to communicate the hopper and the cylinder, the food material in the hopper can be sucked into the cylinder by retracting the piston, and the sucked material, can then be extruded from the cylinder nozzle by arranging the valve to communicate the cylinder and the nozzle and advancing the piston. In this apparatus, however, the material cannot be sucked into the cylinder except for certain kinds of materials which are relatively fluid. That is, less-fluid materials or materials in which a large amount of solid is mixed or which consist only of solid can not be sucked, because if the passage from the hopper to the cylinder is made wider, suction becomes weak, while if it is made sufficiently narrow for suction purposes, clogging occurs.

A screw feeder for extruding food material has also been provided, in which plastic food material, namely, less fluid food material is effectively extruded, but the material could not be extruded in a sufficiently quantitative manner. This screw feeder, of course, is not applicable to materials consisting only of solid.

These apparatuses can handle solid materials only if they are very soft or if they are very small and mixed with other fluid materials.

SUMMARY OF THE INVENTION

It is an object of the present invention to provide an apparatus and method for quantitatively extruding food material.

It is another object of the present invention to provide an apparatus and method for quantitatively extruding various kinds of fluid food materials, food materials containing solids including hard solids food such as diced fresh fruit.

It is a further object of the present invention to provide an apparatus and method for quantitatively extruding food material containing large solids.

It is a still further object of the present invention to provide an apparatus and method for quantitatively extruding and injecting food material into bread or confectionery without using the valve mechanism.

It is a still further object of the present invention to provide an apparatus and method for quantitatively extruding food material, which is further processed at subsequent food production stages thereby attaining sanitary and high quality food products.

In one aspect of the present invention, an apparatus for quantitatively extruding food material is provided, which comprises a hopper, a frame supporting the hopper and having therein a chamber communicating with the hopper and a first port and a second port for the chamber, the first and second ports being disposed oppositely on said frame, a piston mounted to said first port, and a nozzle mounted on said second port, characterized by a cylindrical food forming device provided adjacent said chamber, comprising two or more wall portions, at least one of which is adapted to move toward the other wall portions to form a cylindrical space with front and rear end openings, containing food material, or move away from the other wall portions to introduce food material in the chamber, the rear and front end openings of said cylindrical space communicating with said first and second ports, respectively, and the piston capable of advancing from the first port into the cylindrical space to extrude the food material contained therein and retracting to allow the food material to enter the chamber.

In another aspect of the present invention, a method of quantitatively extruding food material is provided, which comprises feeding food material from a hopper to a chamber below it, temporarily enclosing the food material in the chamber to form a cylindrical body, and extruding said cylindrical body with a position.

In this invention, a cylindrical food forming device, which comprises a plurality of wall portions, is provided. The device is disposed below a hopper and in a frame which supports the hopper. The wall portions are adapted by gears to move toward each other to form a cylindrical space, the rear and front end openings of which communicate with the first and second ports on opposite walls of the frame respectively.

A nozzle is mounted to the second port and a piston is mounted to the first port.

Since the chamber in the frame is very wide as compared with the conventional food suction system, even food material containing large-sized solids can be enclosed in the cylindrical space formed when the wall portions close.

The thus formed cylindrical body of the food material can be extruded by the piston and injected through the nozzle into an article.

Since the apparatus according to the present invention can confine the food material in the chamber by the cylindrical food forming device, food material confined within the space, even when it contains large-sized solids, is then extruded by the piston without any trouble and injected through the nozzle into bread or confectionery.

As aforementioned, the apparatus according to the present invention does not need a valve mechanism or a piston and cylinder assembly for vacuum suction, food material containing even largesized solids can be effectively extruded.

DESCRIPTION OF THE PREFERRED EMBODIMENTS

An embodiment of the present invention will now be described with reference to FIGS. 1-5.

Figure 1:
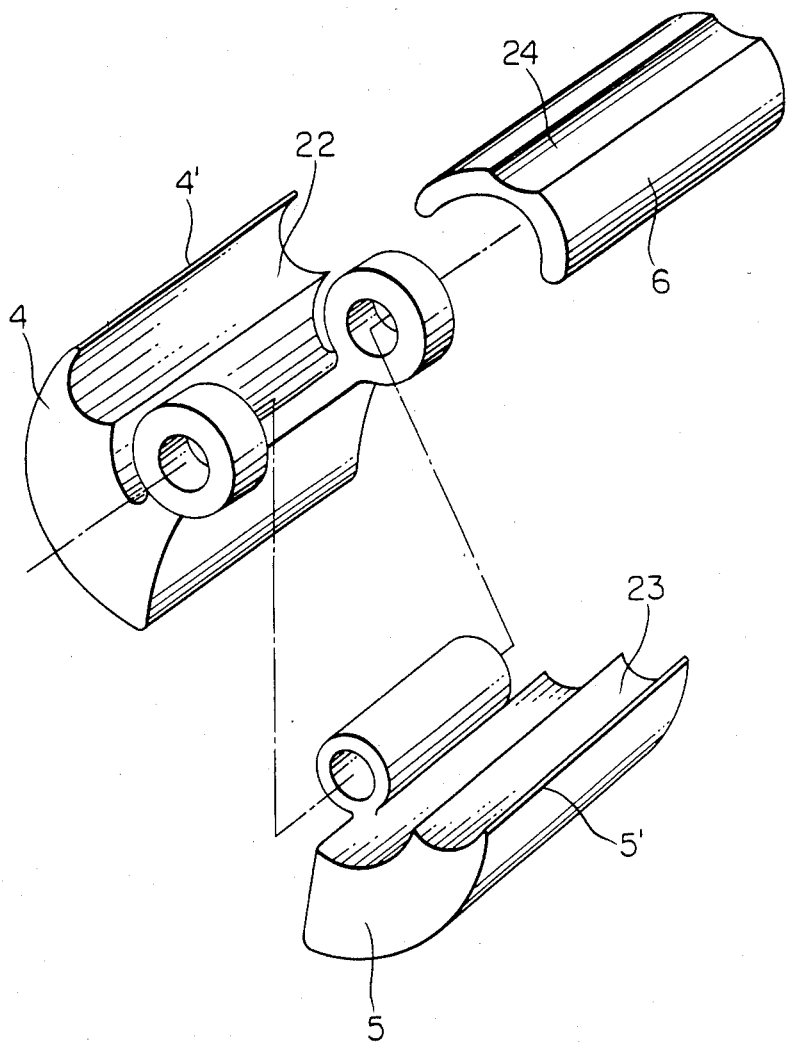
FIG. 1 shows a perspective view of the wall portions of a cylindrical space forming device of a first embodiment of the present invention.

Three wall portions 4, 5, and 6 are separately illustrated as perspective views in FIG. 1.

Figure 2:
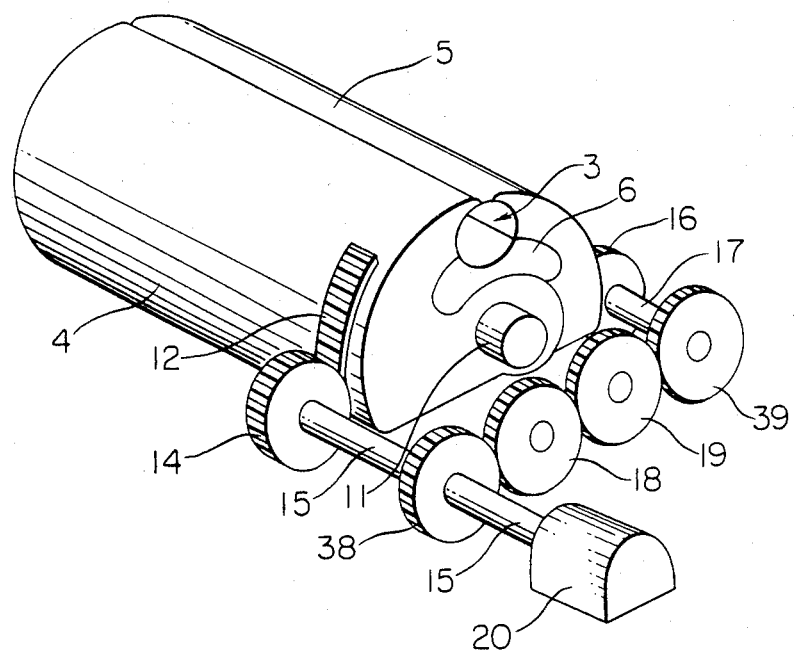
FIG. 2 shows a schematic and perspective view of the cylindrical space forming device of the first embodiment of the present invention.

The wall portions 4 and 5 are pivotally mounted on a pivot shaft 11 to form a hinge. Tips 4' and 5' of the wall portions 4 and 5 function to closely enclose food material and to apply the increased load to a reversible motor 20. A wall portion 6 is adapted to be assembled with the wall portions 4 and 5 and fixedly mounted on a frame 7. Inner surfaces 22 and 23 of the wall portions 4 and 5 and an upper surface 24 of the wall portion 6 are configured such that they form a cylindrical space when the tips 4' and 5' collide, as shown in FIG. 2. The front and rear ends of the cylinder thus formed are open. In FIG. 2, the wall portion 4 has an outer surface which forms an arc in crosssection, and a gear 12 is provided on said surface, and meshes with a gear 14 mounted on an end of a shaft 15, the other end of which is connected to a reversible motor 20. The gear 14 is rotatable by the power transmitted from the reversible motor 20 and, causes the gear 12 to rotate thereby moving tip 4' of the wall portion 4 about the shaft 11 toward or away from the tip 5' of the wall portion 5. Similarly, a gear 13 (FIG. 4) provided on the curved outer surface of the wall portion 5 meshes with the gear 16 and moves the tip 5' of the wall portion 5 about the shaft 11 toward and away from the tip 4' of the wall portion 4 receiving the power from the reversible motor 20 through the the gear 16, the shaft 17 connected to the gear 16, the gear 39 connected to the shaft 17, the gear 19 meshing with the gear 39, the gear 18 meshing with the gear 19, and the gear 38 meshing with the gear 18 and mounted on the shaft 15. As the directions of rotation of the shafts 15 and 17 are opposite, the rotation of the shafts 15 and 17 causes the tips 4' and 5' of the wall portions 4 and 5 to move toward or away from each other.

Figure 3:
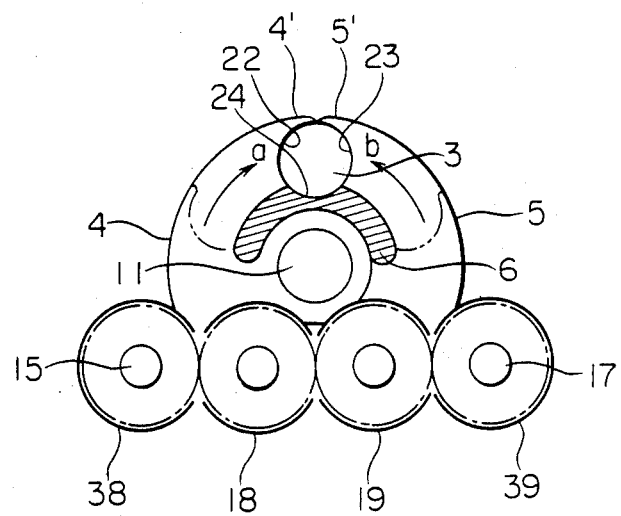
FIG. 3 illustrates the operation of the wall portions of the cylindrical space forming device, where the tips 4' and 5' of wall portions 4 and 5 collide with each other to form a cylindrical space 3, of the first embodiment of the present invention.
Figure 4:
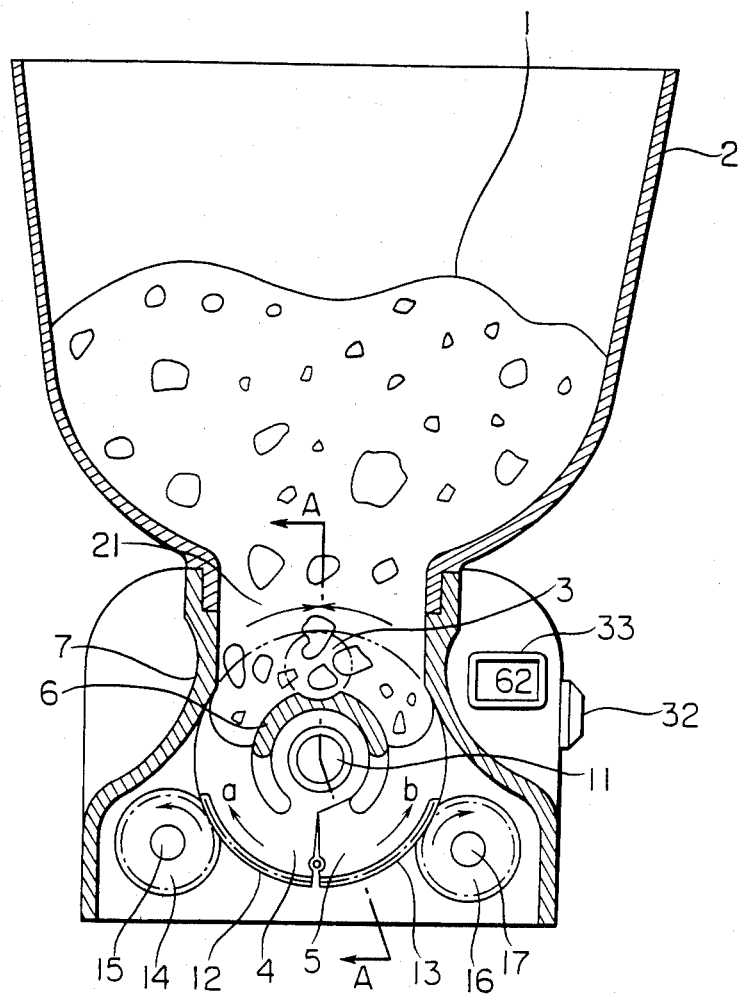
FIG. 4 shows a partly cross-sectional, front elevation view of the first embodiment of the present invention.

In FIG. 3, the wall portions 4 and 5 move in the directions indicated by arrows "a" and "b", until the tips 4' and 5' come into contact to form a cylindrical space 3. When the Tips 4' and 5' move away from each other, the movement will stop when the surfaces 22 and 23 come to the position shown by the phantom lines. In FIG. 4, the bottom surfaces of the wall portions as seen in FIG. 2 are about engage each other and a further movement of the tips 4' and 5' away from each other is prevented.

Figure 5:
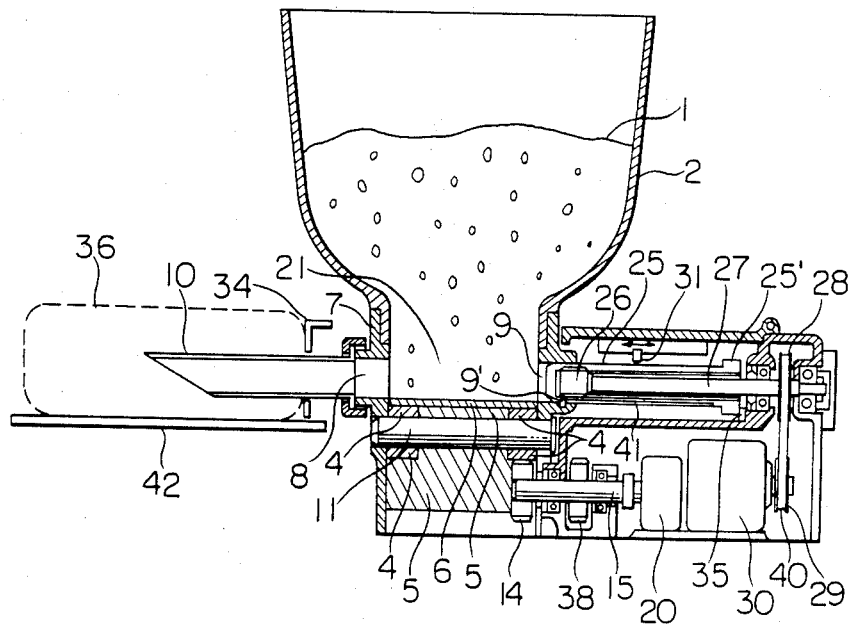
FIG. 5 shows a partly cross-sectional, side elevation view of the first embodiment of the present invention, in which the cylindrical food forming device is viewed along a line A—A in FIG. 4.

In FIGS. 4 and 5, the cylindrical food forming device with the set of gears is mounted on the frame 7 below a chamber 21.

In FIG. 4, food material 1 contains solids, and is placed in a hopper 2 supported on the frame 7. The chamber 21 is formed in the frame 7 between the hopper 2 above it and the cylindrical food forming device below it. The chamber 21 directly communicates with the hopper 2 without any obstruction between them. The outer surfaces of the wall portions 4 and 5 form a circle in cross-section and the shaft 11 is positioned at the center of the circle. The configuration of the walls 6 of the frame 7 is such that they tangentially abut the circle. A knob 32 is provided on the outer surface of the frame 7 and is used to adjust the volume of the food material to be injected into an article 36 (FIG. 5). The volume can be adjusted by the adjustment of the portion of the piston 24 as explained below. The volume of the desired amount is indicated on a display panel 33.

The directions of movement of the tips 4' and 5' of the wall portions 4 and 5 toward each other are indicated by arrows "a" and "b".

In FIG. 5, the pivot shaft 11 is mounted to the frame 7. The chamber 21 is provided with a first port 9 and a second port 8, which are aligned with and of the same size and configuration as the rear and front end openings of the cylindrical space formed by the cylindrical food forming device. A piston 25 is provided outside the first port 9 and is in sliding engagement with it so as to pass through the port 9 in the direction of the second port 8.

The piston 25 is a cylinder with one end closed and its inside surface is threaded. It has a ring form flange 25' at the open end. A cylindrical shaft 27 has an enlarged portion 26 at an end, which portions is externally screw threaded. The portion 26 engages the screw threaded portion of a piston 25.

The other end of the shaft 27 is rotatably supported on the frame 7 through a bearing assembly. A pully 28 is provided near the other end of the shaft 27 and is connected by a belt 40 to a pully 29 mounted on a reversible motor 30. A stopper 31 is mounted on the frame 7 and is movable in the direction shown by the arrow. It selects a position at which the ring 25' of the piston 25 is stopped and generates a signal to direct a reverse rotation of the motor 30. The stopper 31 also generates a signal to the motor 20 to reverse its rotation. The position of the stopper 31 is determined by the operation of the knob 32.

On the other surface of the piston 25 a key groove 41 is provided in the longitudinal direction and it engages a key 9' projecting from the inner surface of the first port 9. This arrangement causes the rotation of the piston 25 together with the rotation of the shaft 27 to be obstructed. Thus the piston 25 can advance or retract along the key 9' when the shaft 27 rotates in one direction or the other receiving the power from the reversible motor 30. The stroke of the piston 25 is determined by the position of the stopper 31. As aforementioned, when the ring 25' comes into contact with the stopper 31, the forward movement of the piston 25 is stopped and the movment is reversed. On the other hand, when the rear end of the piston 25 collides with a rear end switch 35 positioned at a suitable place the switch 35 generates a stop signal for the reversible motor 30.

A nozzle 10 is mounted to the second port 8. The inner diameter of the nozzle 10 may preferably be equal to the inner diameter of the second port 8 and the cylindrical space 3 or smaller. A contact switch 34 is disposed adjacent the nozzle 10, which functions to generate a signal to rotate the reversible motor 20, when the contact 34 engages an article 36 or an operator's hand.

The operation of the first embodiment of the present invention will now be described.

The food material 1 containing solids is charged in the hopper 2 and accumulates in the chamber 21. When the article 36 is placed on a table 42 as shown by a broken line and the nozzle 10 is inserted into the article 36, the contact switch 34 transmits a signal to the reversible motor 20 to cause it to rotate in a normal direction. The power of the motor 20 is transmitted through the shaft 15 and a series of gears thereby moving the wall portions 4 and 5 to cause the tips 4' and 5' to collide with each other. Thus, the food material is surrounded by the surfaces 22, 23, and 24, the rear end of the food material remaining in the nozzle 10 from the preceding operation, and the front end of the piston 25. Therefore, a cylindrical body of the food material is formed. The operator turns the knob 32 to select the position of the stopper 31 thereby determining the desired stroke of the piston 25. The stroke defines the volume of the food material 1 to be injected into the article 36, which is displayed on the display panel 33.

Even when the solids mixed in the food material 1 is larger than the inner diameter of the cylindrical space 3, the tips 4' and 5' can cut it to enclose it within the cylindrical space. The reversible motor 20 is adapted to sense the increased load caused by the collision of the tips 4' and 5' and automatically stop its operation. It is preferable to provide a relay to the reversible motor 20, which actuates the reversible motor 30 the reversible motor 20 is stopped.

Therefore, the reversible motor 30 can be operated by the signal from the relay or by the operator through an input switch. The operation of the reversible motor 30 causes the advance of the piston 25 thereby extruding the food material 1 within the cylindrical space, into the nozzle 10.

When the piston 25 comes into contact with the stopper 31, the stopper 31 sends a signals to the reversible motor 30 and the reversible motor 20 to rotate in the reverse direction, the piston 25 begins to retract and the tips 4' and 5' of the wall portions 4 and 5 begin to move away from each other. The reverse rotation of the motor 30 stops when the rear end of the ring 25' comes into contact with the rear end switch 35, and the reverse rotation of the motor 20 stops when it senses an increased load caused by the collision of the bottom surfaces of the wall portions 4 and 5. Thus, the food material can enter the chamber 21 and accumulates there.

Figure 6:
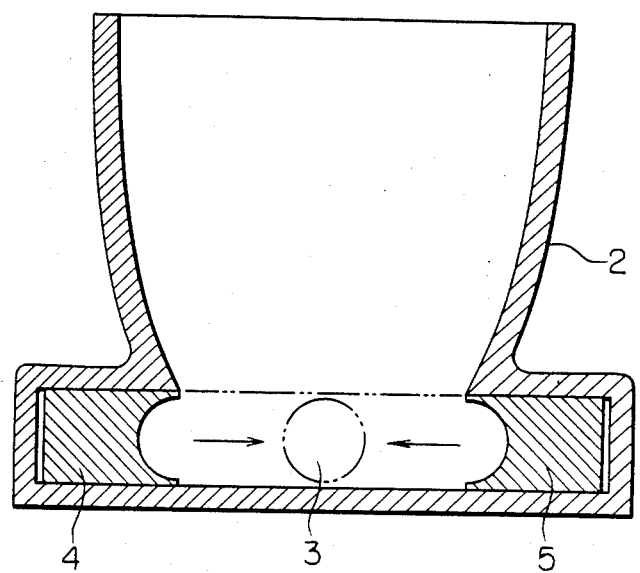
FIG. 6 shows a cross-sectional, front elevation view of the wall portions of the cylindrical food forming device of a second embodiment of the present invention.

The second embodiment of the present invention will now be described with reference to FIG. 6. The cylindrical food forming device is composed of two wall portions 4 and 5, each having a longitudinal recess semi-circular in cross-section which can horizontally approach each other to form a cylindrical space 3.

Figure 7:
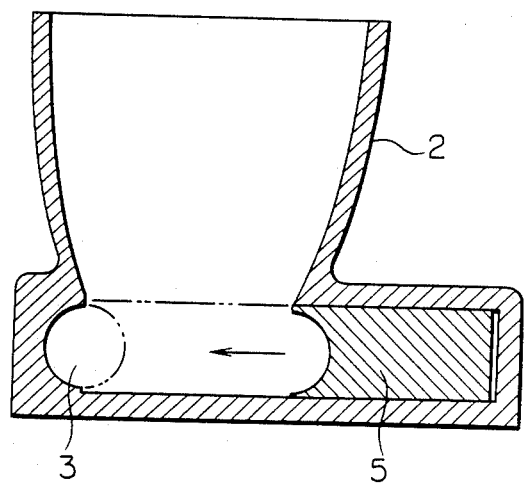
FIG. 7 shows cross-sectional, front elevation view of the wall portions of the cylindrical food forming device of a third embodiment of the present invention.

The third embodiment of the present invention is described with reference to FIG. 7, in which only one wall portion 5 is adapted to horizontally move to another wall portion formed on the wall of the frame below the hopper 2.

Figure 8:
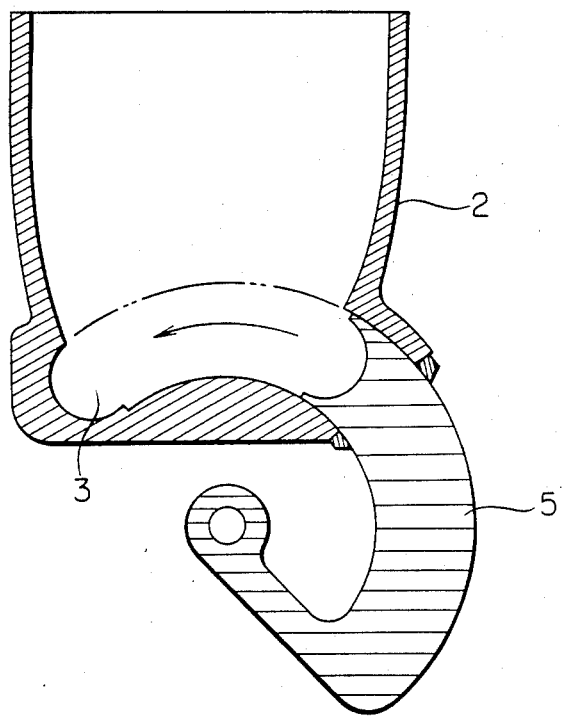
FIG. 8 shows a cross-sectional front elevation view of the wall portions of the cylindrical food forming device of a fourth embodiment of the present invention.

The fourth embodiment of the present invention is described with reference to FIG. 8 in which only one wall portion 5 is adapted to swingably move to approach another wall portion formed like the third embodiment.

Figure 9:
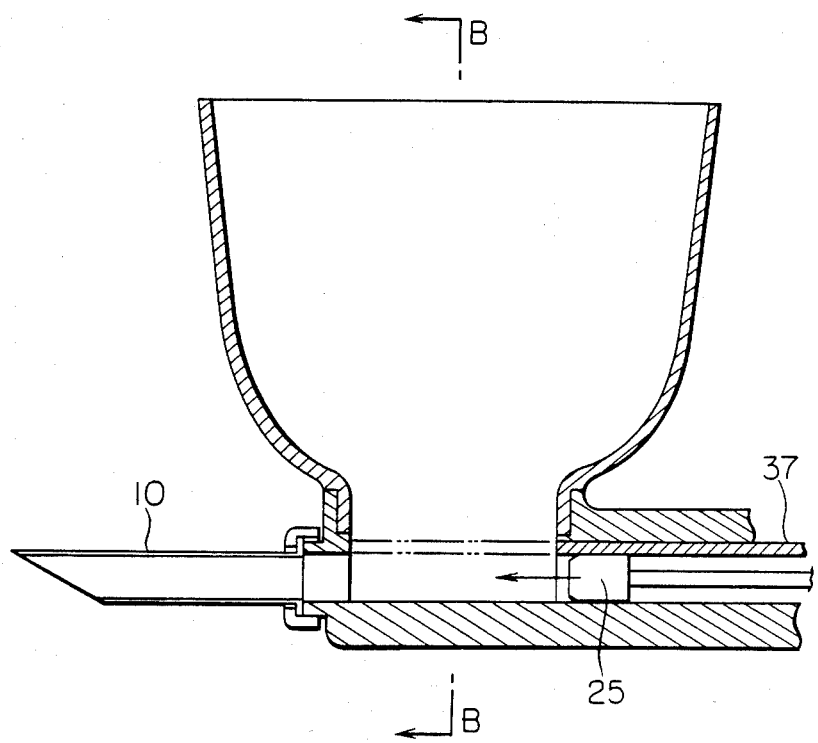
FIG. 9 shows a cross-sectional, side elevation view of the wall portions of the cylindrical food forming device of a fifth embodiment of the present invention.
Figure 10:
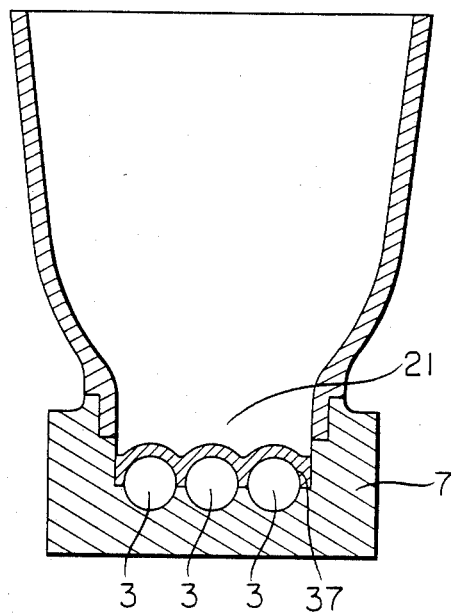
FIG. 10 shows a cross-sectional, front elevational view taken on a line B—B in FIG. 9, when the wall portion 37 is in place to form a cylindrical space.

The fifth embodiment of the present invention is described with reference to FIGS. 9 and 10. A slidable wall portion 37 having three longitudinal recesses each semi-circular in cross-section. The slidable wall portion 37 move toward the chamber 21 to form three cylindrical spaces 3 together with three longitudinal recesses provided on the bottom of the frame 7, thereby enclosing the food material within the thus formed three cylindrical spaces.

As aforementioned, the device and method according to the present invention comprises temporarily forming the cylindrical body of the food material within a cylindrical space and extruding thus formed body. Therefore, the chamber below the hopper can have large dimensions, permitting the chamber to receive large solids.

The device according to the present invention can provide the quantitative and effective extrusion of less fluid material or material containing solids. Even if the size of solids is larger than the diameter of the cylindrical body, they can be cut to size by the coaction of the wall portions. Furthermore, the food material consisting only of solids can be enclosed within the temporarily formed cylindrical space and extruded.

When the inner diameter of the nozzle is smaller than that of the cylindrical space, an eddy stream of the material would occur, or a block would be formed by the solids near the formed end of the cylindrical space. These phenomena can be avoided by designing the inner diameter of the nozzle so as to be equal to that of the cylindrical space.

We claim:

1. An apparatus for quantitatively extruding food material comprising a hopper, a frame supporting the hopper and having therein a chamber communicating with the hopper and a first port and a second port for he chamber, the first and second ports being disposed oppositely on said frame, a piston mounted to said first port, and a nozzle mounted on said second port, characterized by a cylindrical food forming device provided adjacent said chamber, comprising tow or more arcuate wall means, at least one of which is movable toward the other wall means to form a cylindrical space with front and rear end openings, containing food material, and movable away form the other wall means to introduce food material in the chamber, the front and rear end openings of said cylindrical space communicating with said first and second cylindrical space communicating with said first and second ports, respectively, and the piston being advanceable from the first port into the cylindrical space to extrude the food material contained therein and retractable to allow the food material to enter the chamber.

2. An apparatus of claim 1, wherein the inner diameter of said cylindrical space equals to the inner diameter of said nozzle.

* * * * *